US012778087B2

(12) United States Patent
York

(10) Patent No.: US 12,778,087 B2
(45) Date of Patent: Nov. 3, 2026

(54) SUET MOLD AND CAGE MOUNTING SYSTEM AND METHOD OF USING SAME

(71) Applicant: Lyssa Colleen York, Roscommon, MI (US)

(72) Inventor: Lyssa Colleen York, Roscommon, MI (US)

( * ) Notice: Subject to any disclaimer, the term of this patent is extended or adjusted under 35 U.S.C. 154(b) by 0 days.

(21) Appl. No.: 18/907,656

(22) Filed: Oct. 7, 2024

(65) Prior Publication Data

US 2025/0024819 A1 Jan. 23, 2025

Related U.S. Application Data

(62) Division of application No. 17/592,315, filed on Feb. 3, 2022, now Pat. No. 12,108,742.

(51) Int. Cl.
*A01K 39/01* (2006.01)

(52) U.S. Cl.
CPC .................................. *A01K 39/01* (2013.01)

(58) Field of Classification Search
CPC .................................................. A01K 39/0106
See application file for complete search history.

(56) References Cited

U.S. PATENT DOCUMENTS 3,848,570 A * 11/1974 Scigliano ........... A01K 39/0106 119/51.03
5,606,933 A * 3/1997 Wilkins ............. A01K 39/0206 119/51.03
5,826,541 A * 10/1998 Wilkins ............. A01K 39/0106 119/57.8
2007/0028843 A1 * 2/2007 Nock ................. A01K 39/0106 119/51.03

* cited by examiner

*Primary Examiner* — Joshua J Michener
*Assistant Examiner* — Nicole Paige Maccrate
(74) *Attorney, Agent, or Firm* — Mitchell Intellectual Property Law, PLLC

(57) ABSTRACT

A system for conveniently and easily filling a suet cage with molded home-made suet, and for mounting the filled suet cage easily, securely, and neatly on an outdoor mount in any weather. In a further aspect a magnetically-coupled tailpiece is provided for engaging a lower end or corner of a suet cage when the cage is mounted on an outdoor support.

4 Claims, 11 Drawing Sheets

SUET MOLD AND CAGE MOUNTING SYSTEM AND METHOD OF USING SAME

CROSS REFERENCE TO RELATED APPLICATIONS

The application is a divisional of application Ser. No. 17/592,315 filed Feb. 3, 2022, which claimed priority to provisional patent application Ser. No. 63/150,646 filed Feb. 18, 2021, both incorporated herein by reference.

FIELD

The subject matter of the present application is in the field of suet-cage bird feeders.

BACKGROUND

Suet cages are commonly used for feeding birds outdoors. The cages typically comprise a shallow box of strong wire in a grid pattern, with an interior volume sized to hold a block of suet. The spaces between the wires are big enough for birds to reach through with their beaks to eat from the block of suet in the cage. One face or sidewall of the suet cage includes a door, lockable with a clasp or chain, that can be opened to insert a fresh block of suet into the cage interior and then closed to securely hold the suet block inside the cage. The suet-filled cage is then typically suspended from an off-the-ground support such as a tree limb or a bird feeder pole with a chain or wire.

Bird lovers know that working with suet cages is often less than ideal, as the cages can be fussy to open and close, messy, and prone to breaking.

Many people prefer to make their own suet rather than buy pre-formed, pre-sized blocks from the store, either for cost savings or to ensure that the suet ingredients meet their standards. It is inconvenient and messy, however, to melt and mold suet and to fill suet cages with home-molded suet. Most people use whatever kitchen pots or pans they have available to mold the suet, and then cut suitably-sized blocks from the hardened suet. The excess suet is difficult to clean from the pans. The final result when inserted in the cage can be rough and unattractive, which can be an important consideration to people who hang the cages for easy viewing outside their windows.

BRIEF SUMMARY OF THE INVENTION

I have invented a system for easily and cleanly filling suet cages with homemade or home-melted suet, and for mounting the filled cages at a convenient height for viewing. The system provides a filled suet cage that is well-filled, easy to work with, attractive, and more durable and convenient to mount and use than conventional hinged-door suet cages in which blocks of pre-formed suet are placed.

A wire grid suet comprising a substantially flat top face, a substantially flat bottom face, and a substantially continuous sidewall extending around edges of the top and bottom faces to space the top face from the bottom face and to define an interior suet volume accessible by a bird with its beak through spaces in the wire grid has a handle structure on the top face extending above the top face. In use, a molding pan is filled with melted suet. The suet cage is lowered into the melted suet in the molding pan and the suet is allowed to cool and congeal around and through the cage. The cage and the suet congealed in it is then lifted out of the molding pan by the handle and oriented so that its length is vertical and hung or mounted in a substantially vertical orientation in a convenient location for the birds.

These and other features and advantages of the invention will become apparent from the detailed description below, in light of the accompanying drawings.

GENERAL DESCRIPTION OF THE EMBODIMENTS

Figure 1:
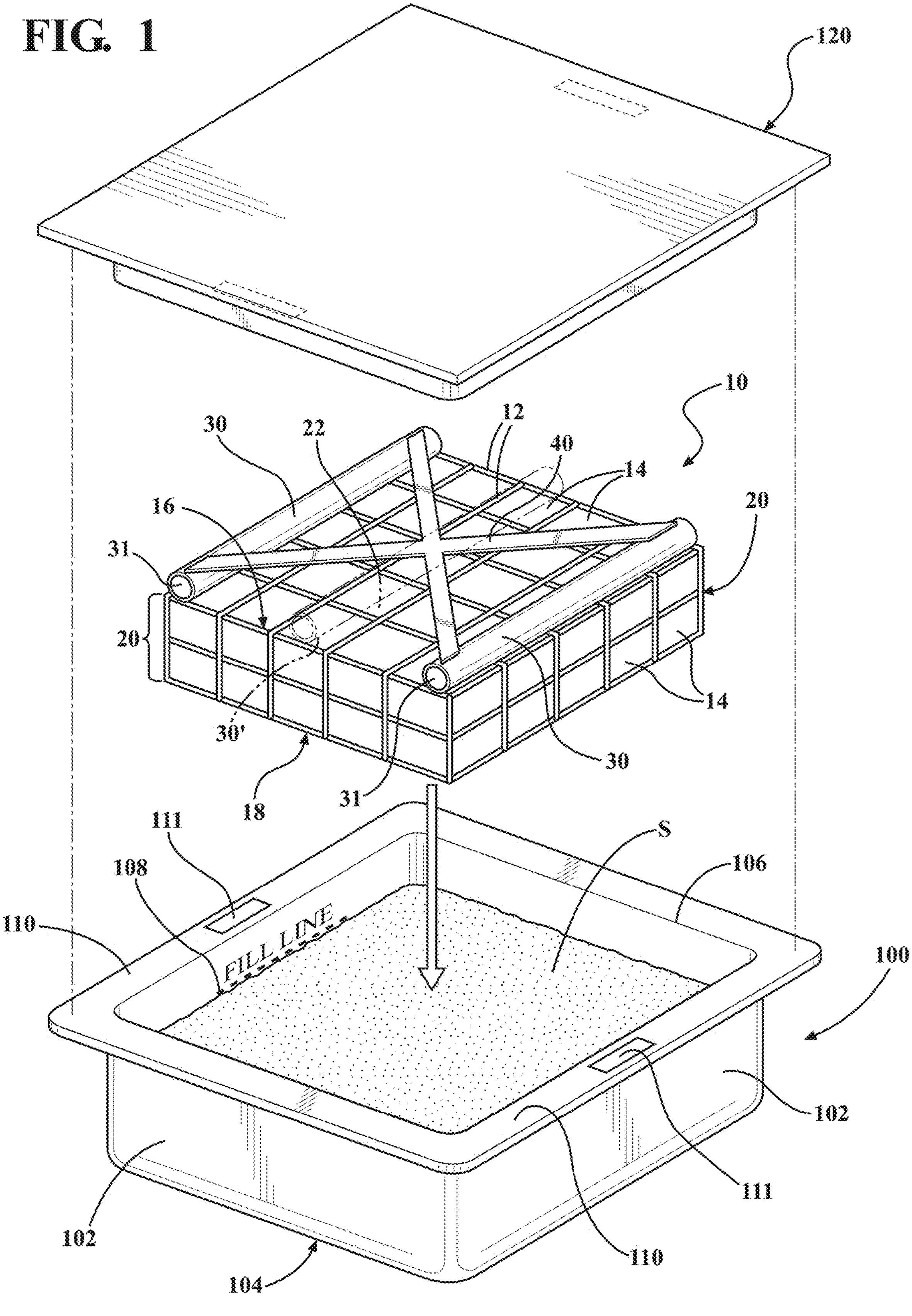
FIG. 1 is a perspective view of a suet cage system according to an example of the inventive system, showing a suet cage in exploded assembly view above a mating suet pan and below a mating suet pan lid.

In a first embodiment, the system comprises a shallow three-dimensional suet cage with a “top” face that stays above the suet in a pan when horizontal during the molding process, and that normally forms the rear face of suet cage when the cage is vertical; a “bottom” face configured to rest on the bottom of a suet pan when the cage is horizontal, and that normally forms the front face of the suet cage when the cage is vertical; and sides joining the top/rear and bottom/front faces in spaced fashion to define a suet-containing volume between them. The faces and sides of the cage may be made with a typical grid structure and material, but the cage need not be openable; i.e, it does not need to have a door and associated mechanical features for opening, closing, and locking the cage to secure a pre-formed block of suet. The system further comprises a suet melting/molding pan dimensioned to fit closely around the sides of the cage, the pan including a suet fill line positioned to leave the top face of the cage remaining approximately at or above the level of melted suet in the pan when the bottom face of the cage is placed horizontally down into the bottom of the pan. The top face of the cage comprises at least one raised handle. In a preferred form, the bottom face of the cage is smaller in area than the top face so that the sides of the cage are angled inwardly between them, and the suet pan has correspondingly-angled sides.

In use, the molding pan is filled with melted suet. The suet cage is lowered into the melted suet in the molding pan and the suet is allowed to cool and congeal around and through the cage. The cage and the suet congealed in it is then lifted out of the molding pan by the handle and oriented so that its length is vertical, and hung or mounted in a substantially vertical orientation in a convenient location for the birds.

In a further form the handle comprises at least one tubular handle member, and preferably a pair of tubular handle members, located adjacent an outer surface of the upper (above-the-suet) face of the cage. The tubular handle member(s) has (have) a thickness or diameter sufficient to serve as handle(s) above the top face of the cage, and/or to support and space a transverse handle member between them above the top face of the cage.

The suet pan may further comprise a stackable lid configured to provide clearance for the handled top face of the suet cage as the cage sits in the suet in the pan, allowing multiple pans to be stacked in a cool place for hardening or storage.

In a further form, the system includes a cage-mounting fixture comprising at least one tubular mounting member and preferably a pair of spaced tubular mounting members configured to receive the tubular handle member(s) on the top face of the suet cage in a longitudinal, generally vertical sliding fit. The cage-mounting fixture has a base that may be secured with fasteners to an off-the-ground support such as a tree, post, or wall. Another option is to integrally or permanently combine the cage-mounting fixture with an upright support, such as a stake or "shepherd's hook".

"Tubular" is used herein to include both solid and hollow members, of varying cross-section, that can be mated with one another in a longitudinal sliding manner. For example, the tubular handle members may be hollow tubes, and the tubular mounting members may be solid.

"Wire" is used herein to mean the general grid-like structural members forming the mesh pattern on the faces of the suet cage, and includes both metal and plastic mesh or grids, and is not limited to a rounded cross-section.

In a second embodiment, a tail rest is provided to detachably engage a lower side of a filled suet cage. In a preferred form, the tail rest comprises a generally planar vertical body shaped to support a bird's tail, and a shaped notch or connection surface at an upper end configured to mate with a sidewall or corner of the cage. In one form, a V-shaped connection surface comprises a pair of diverging, angled, flat magnetic surfaces having a width generally corresponding to the width of two adjacent ferromagnetic sidewall surfaces of the suet cage. A lower corner of appropriately-shaped suet cage can be connected to the V-shaped connection surface in a diagonal orientation, such that the tail rest is magnetically clamped to the cage.

DETAILED DESCRIPTION OF THE EMBODIMENTS

Referring first to FIGS. 1-4, a suet cage 10 is shown in exemplary form in order to teach how to make and use the claimed invention. Suet cage 10 is configured especially for use with a mating suet pan 100 and optional lid 120 as part of a molding system, although suet cage 10 could be used with other pans, or with pan 100 without a pan lid.

In the illustrated example, suet cage 10 is made from a durable wire material 12 of a type known for use in suet cages, preferably although not necessarily steel, and optionally coated in known manner with a rust-preventative plastic or other known treatment such as a galvanized surface. Wire 12 forms a grid pattern of known type, with spaces 14 between the individual wires in the grid large enough for a bird to feed through. Suet cage 10 may have a known shape such as a typical flattened shallow three-dimensional rectangular "box", although it need not be rectangular or square as shown and may take other shallow three-dimensional shapes such as rounded, triangular, etc. Suet cage 10 has a substantially flat top/rear face 16, a substantially flat bottom/front face 18 parallel to the top face 16, and sidewalls 20 joining the top and bottom faces to define an enclosed interior volume 22. An example size for suet cage 10 may be roughly eight (8) inches square for faces 16, 18 and roughly two (2) inches high as measured by the height of the sidewalls 20 between the faces. Whatever material is used for suet cage 10, for example metal or plastic, it must be capable of maintaining its shape and structural integrity when immersed in hot melted suet, which may be at near-boiling temperatures.

Suet cage 10 as shown in the illustrated example is preferably solid or "fixed" as shown, meaning that the top and bottom faces 16, 18 and the sidewalls 20 are joined in fixed, permanent fashion, without any need for moving parts such as hinged doors or panels for access to the interior volume 22. Access to interior volume 22 is accordingly only through the spaces 14 between the wires 12. While it would be possible to make suet cage 10 with a known type of access door to the interior, for example with a known type of hinge connection 19 with a releasable clasp 21 for hinging some or all of the top or front face 18 to the cage in known, openable manner as shown in phantom lines in FIG. 5, it is unnecessary in the present invention and would tend to add a potential failure point to the cage structure. However, such an openable face or sidewall in the cage would allow the optional use of pre-formed suet blocks as desired, while leaving the cage mounted on its associated mount (described below).

The top face 16 of suet cage 10 includes one or more longitudinal "tubular" handle/mounting members 30, in the illustrated example a pair of spaced tubular members 30 securely mounted to top face 16 at the outer edges of the suet cage in parallel to one another. A single, centered tubular member 30' is shown in phantom in FIG. 1 as a possible alternative arrangement to the spaced members 30 shown in solid lines where a single handle/mounting member 30 is desired, or as an addition to the spaced members 30 if more than two members 30 are desired. Tubular members 30 may be hollow and open-ended (at one or both ends 31) as shown, or may be solid (i.e., rods), and while preferably cylindrical as shown may take other cross-sectional shapes including non-round shapes. Tubular members 30 may be attached directly to the top face 16 of suet cage 10, as shown, or may be spaced from top face 16 with stand-off features attached to top face 16 or to some other part of the cage. Methods of attachment of members 30 to the cage include any known in the art, including but not limited to welding, molding, adhesive, or mechanical fasteners or connectors, depending on the compatibility of materials used for wire 12 and tubular members 30. Tubular members 30 and any additional associated handle structure may also be integrally formed with the cage during manufacture of the cage. In the illustrated example, tubular members 30 are preferably made from plastic or metal tubing, and are on the order of one-half inch (½") in diameter or width. If a single tubular mounting member 30 is used instead of the illustrated spaced multiple members, the single tubular mounting member would best be mounted in a centered location on the top face 16 of the cage.

While the one or more tubular members 30 may function as handles, they are preferably supplemented with one or more transverse handle members 40 bridging the tubular members, in the illustrated example one or more metal or plastic cross-straps connected securely at their ends to tubular members 30 and strong enough to lift the suet-filled cage without breaking. While transverse handle member 40 is shown in a preferred X-configuration, other configurations are possible depending on the number of tubular mounting members 30 and corresponding transverse handle members; examples include single or multiple cross-straps 40 extending across the cage at right angles to the tubular members 30. Although flat cross-straps are currently preferred for transverse handle members 40, other non-flat shapes and forms are possible for the transverse handle member(s).

Figure 2:
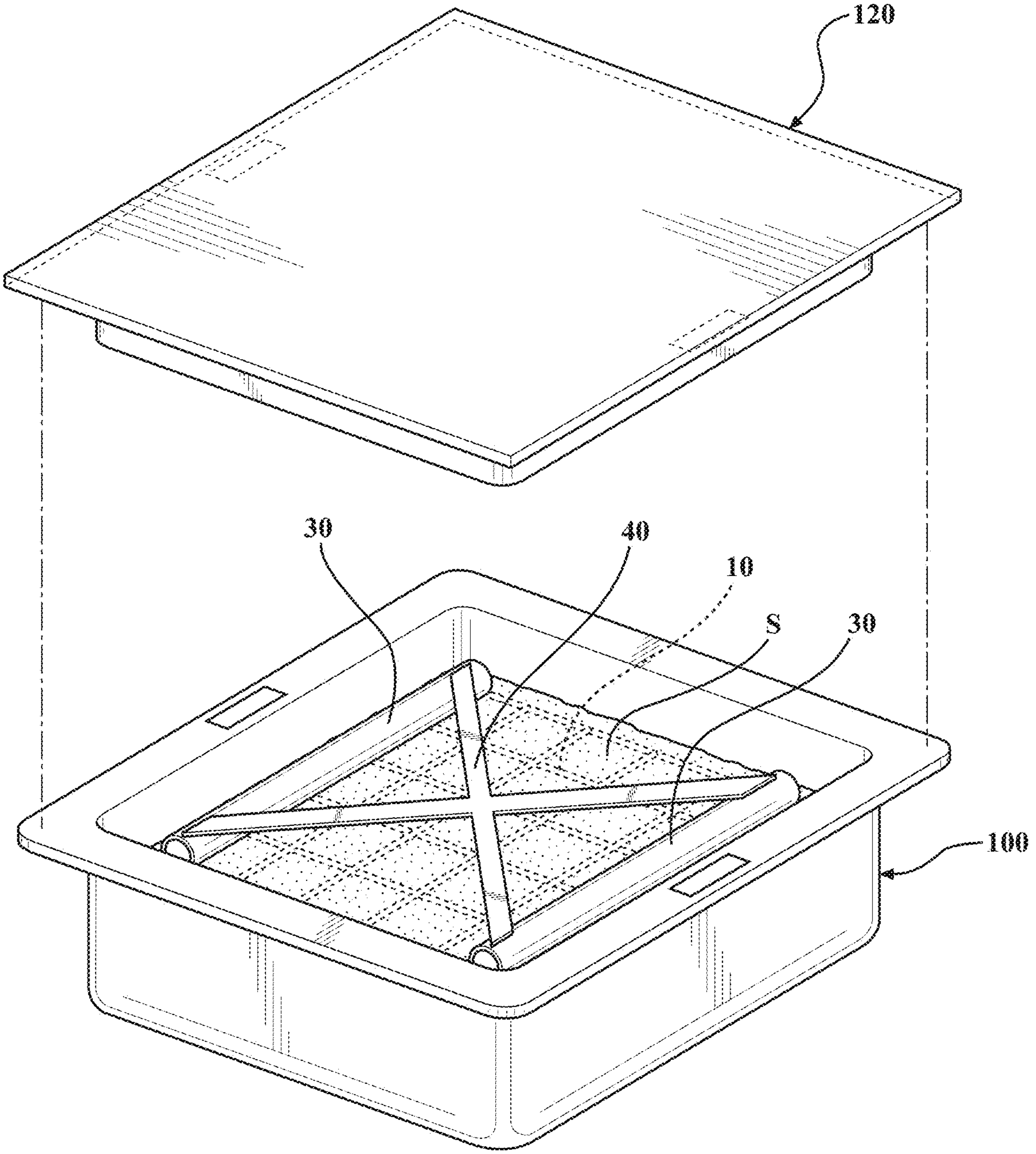
FIG. 2 shows the suet cage of FIG. 1 lowered into the suet pan and mostly submerged in melted suet.
Figure 3:
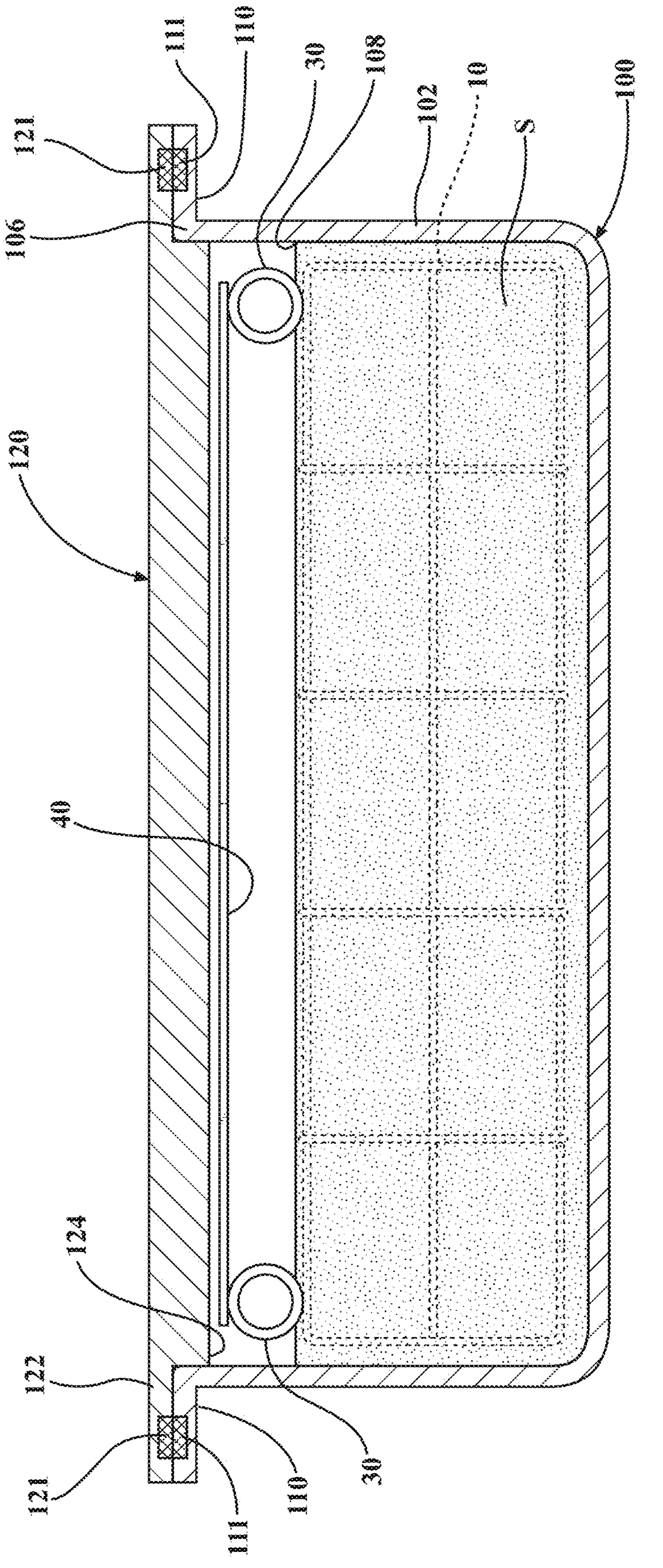
FIG. 3 shows the suet cage system of FIG. 1 in side section, with the cage inserted as in FIG. 2 and with the suet pan lid mated over the suet cage on the suet pan.

The system of the invention includes a suet melting/molding pan 100 configured with interior dimensions that closely fit the exterior dimensions of the suet cage sides 20 in a matching shape, e.g., roughly eight inches square as shown in the illustrated example. As best shown in FIGS. 2 and 3, the area of suet pan 100 is slightly larger than the area of the top and bottom faces 16, 18 of suet cage 10, enough so that the suet cage 10 can be easily inserted into and removed from the suet pan 100 in a horizontal orientation. The depth (height) of suet pan 100 is preferably sufficient to contain suet cage 10, including tubular and transverse handle members 30 and 40, within the interior volume of the pan, below the upper edge or rim 106 of sidewalls 102, when the flat bottom face 18 of the suet cage 10 is laid on the bottom 104 of suet pan 100, in order to better contain the melted suet and for the pan to receive an optional lid.

Sidewalls 102 of suet pan 100 in the illustrated example of FIGS. 1-4 are straight and vertical between bottom 104 and upper rim 106, parallel to the straight sidewalls 20 of suet cage 10 without any taper. One or more of sidewalls 102 is marked with an easily distinguished suet fill line 108 that is no higher than the top face 18 of suet cage 10 when the suet cage 10 is laid in the suet pan 100 pan as shown in FIGS. 2 and 3.

Suet pan 100 may further include one or more pairs of handles 110 extending outwardly from the upper sidewalls 102 or from the rim 106 of the pan, on at least two opposite sides of the pan for balance. In the illustrated embodiment, at least some of handles 110 are magnetic, i.e., capable of being magnetically coupled by virtue of being formed at least partly from a ferromagnetic steel or by including magnets or magnetic strips or inserts 111 in the handle material. Suet pan 100 may optionally have a continuous, outwardly-projecting horizontal flange 110 extending around at least two opposite sides of the rim 106, as shown in the illustrated example of FIG. 1, to function as sets of handle surfaces around all sides of the pan.

The fill line(s) 108 on the interior sidewall of suet pan 100 are positioned so that when the pan is filled with melted suet S up to the fill line 108, placing the suet cage 10 in the pan (FIG. 2) will leave the level of melted suet roughly at or slightly below the outer surface of top face 16. This ensures that tubular handle members 30 remain mostly or entirely free of suet, especially if hollow, and that transverse handle member 40 is sufficiently spaced above any suet that might adhere to the top face 16 to allow handle 40 to be grasped without touching the suet.

Once suet cage 10 is submerged in the melted suet in pan 100 as shown in FIGS. 2 and 3, the suet pan 100 is placed in a cool location for the suet to congeal or harden in known manner.

FIG. 3 shows the optional-but-preferred lid 120 configured for suet pan 100 placed on top of the suet pan. Lid 120 includes an upper side 122 with dimensions configured to extend over rim 106 on the suet pan, and preferably to overlie any handle portions 110 extending from the rim 106. Lid 120 also includes a lower inset side 124 with dimensions configured to fit inside rim 106, but to be spaced above the suet cage handle members 30 and 40. The portions of lid 120 that overlie the magnetic handle portions 110 on the rim 106 of suet pan 100 are also configured to magnetically couple with the magnetic handle portions 111, for example by including or being formed from magnets 121 of mating polarity or from ferromagnetic steel. In this manner the lid 120 is firmly clamped to the rim 106 of the suet pan 100 to protect the hardening suet, and to allow additional suet-filled suet pans 100 to be stacked on top.

Figure 4:
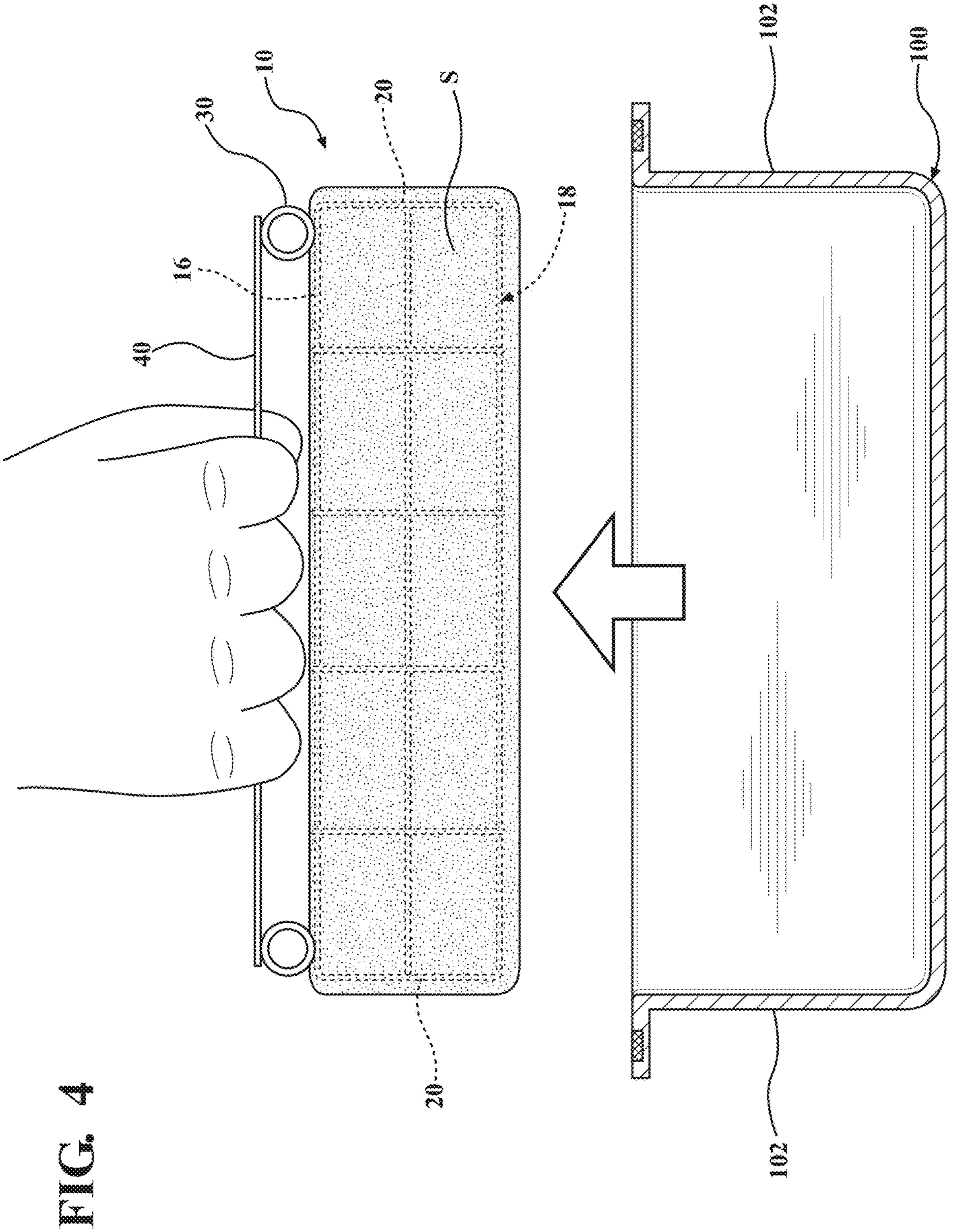
FIG. 4 shows the suet cage of FIG. 1 being lifted out of the suet pan after the suet has hardened in the cage.

FIG. 4 shows suet cage 10 being lifted out of suet pan 100 after the suet S has hardened. The closely-matching configurations of the cage 10 and pan 100 allow the cage to be lifted out with only a minimal amount of excess suet around the sidewalls 20 of the cage 10, making the separation of the cage and pan very easy without having to trim away excess suet or to cut the cage out of a mass of hardened suet. The suet-filled cage 10 should have a neat, smooth layer of suet molded around the sidewalls 20 and the bottom face 18, so that when cage 10 is initially mounted on its cage mount (described below, and shown in FIGS. 5-7) it looks largely like a solid block of suet, with the wires 12 on the sidewalls 20 and bottom face 18 largely hidden beneath the outer layer of over-molded suet. It may be desirable to scrape some of the suet S away from the bottom face 18 and sidewalls 20 of cage 10 to expose some of the wire 12, in order to help birds perch on the wire when they first start feeding on the suet.

Figure 4A:
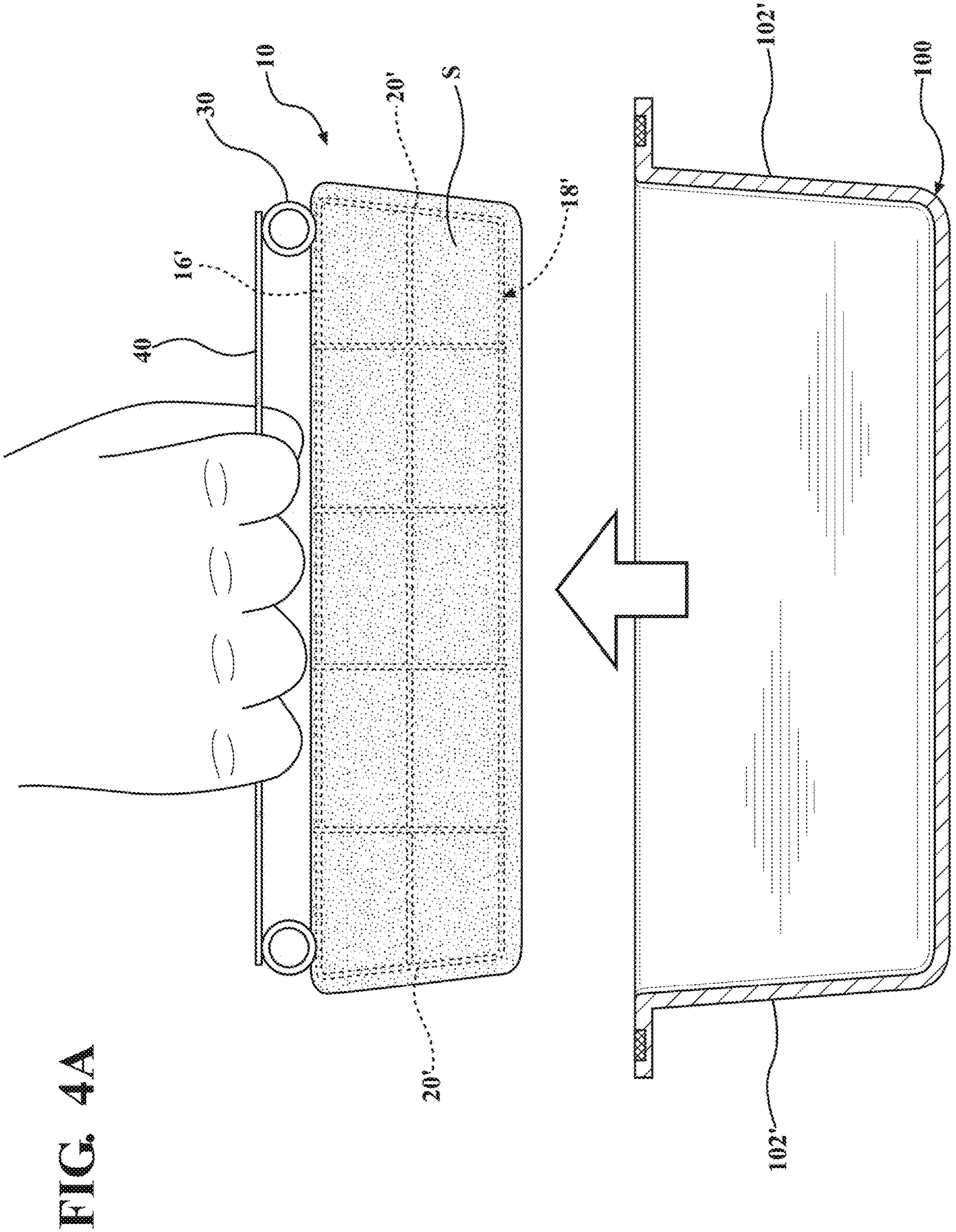
FIG. 4A is similar to FIG. 4, but shows a modified suet cage and suet pan in which the sidewalls of both are angled inwardly between the top and bottom faces of the cage.
Figure 4B:
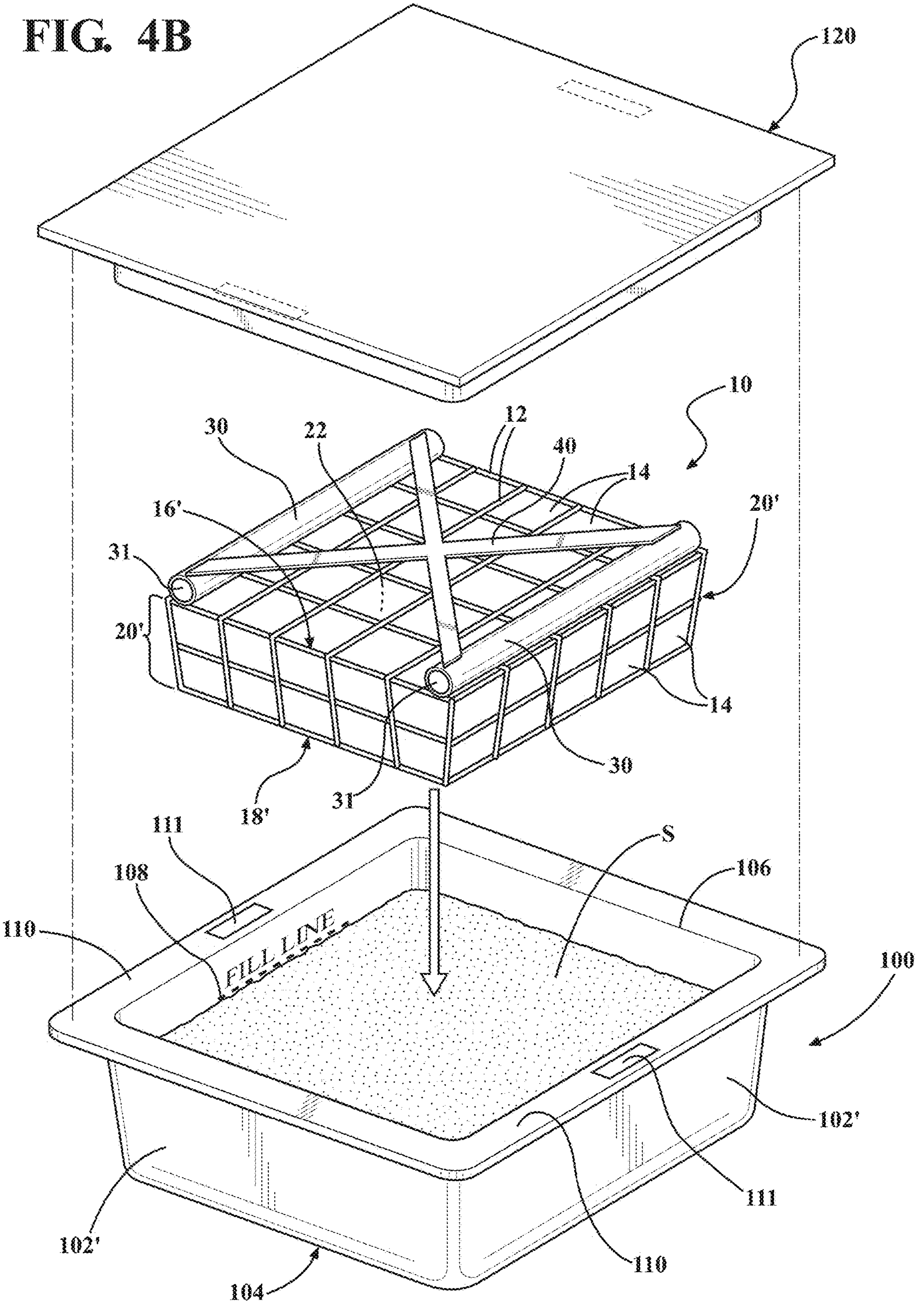
FIG. 4B is similar to FIG. 1, but shows the modified suet cage and suet pan of FIG. 4A with angled sidewalls.

Referring to FIGS. 4A and 4B, an optional cage shape is shown in which top face 16' is larger than bottom face 18', and the sidewalls 20' are angled inwardly from the top face to the bottom face. Additionally, suet pan 100 is shown with correspondingly-angled sidewalls 102' to keep a closely-matching fit around the sidewalls 20' of the cage 10, in order to minimize the amount of excess suet around the sidewalls of the cage. This angled-sidewall configuration of the modified cage and the suet pan is believed to allow slightly easier removal of the suet-filled cage 10 from the pan 100 after the suet has hardened.

Figure 5:
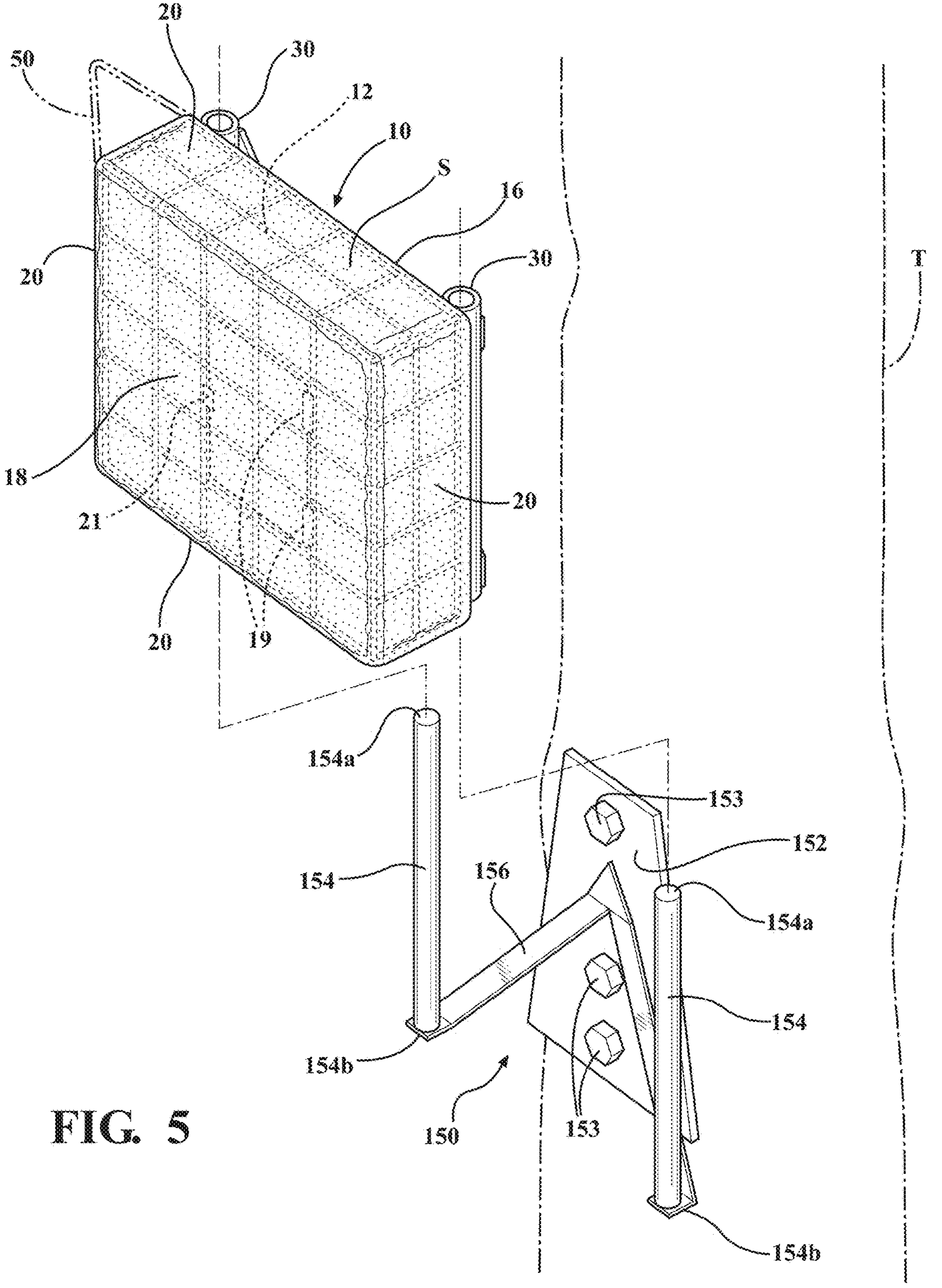
FIG. 5 is a perspective front view of the suet cage of FIG. 1, oriented vertically and shown in exploded assembly relative to a fixture mount configured to receive tubular handle members on the suet cage.
Figure 6:
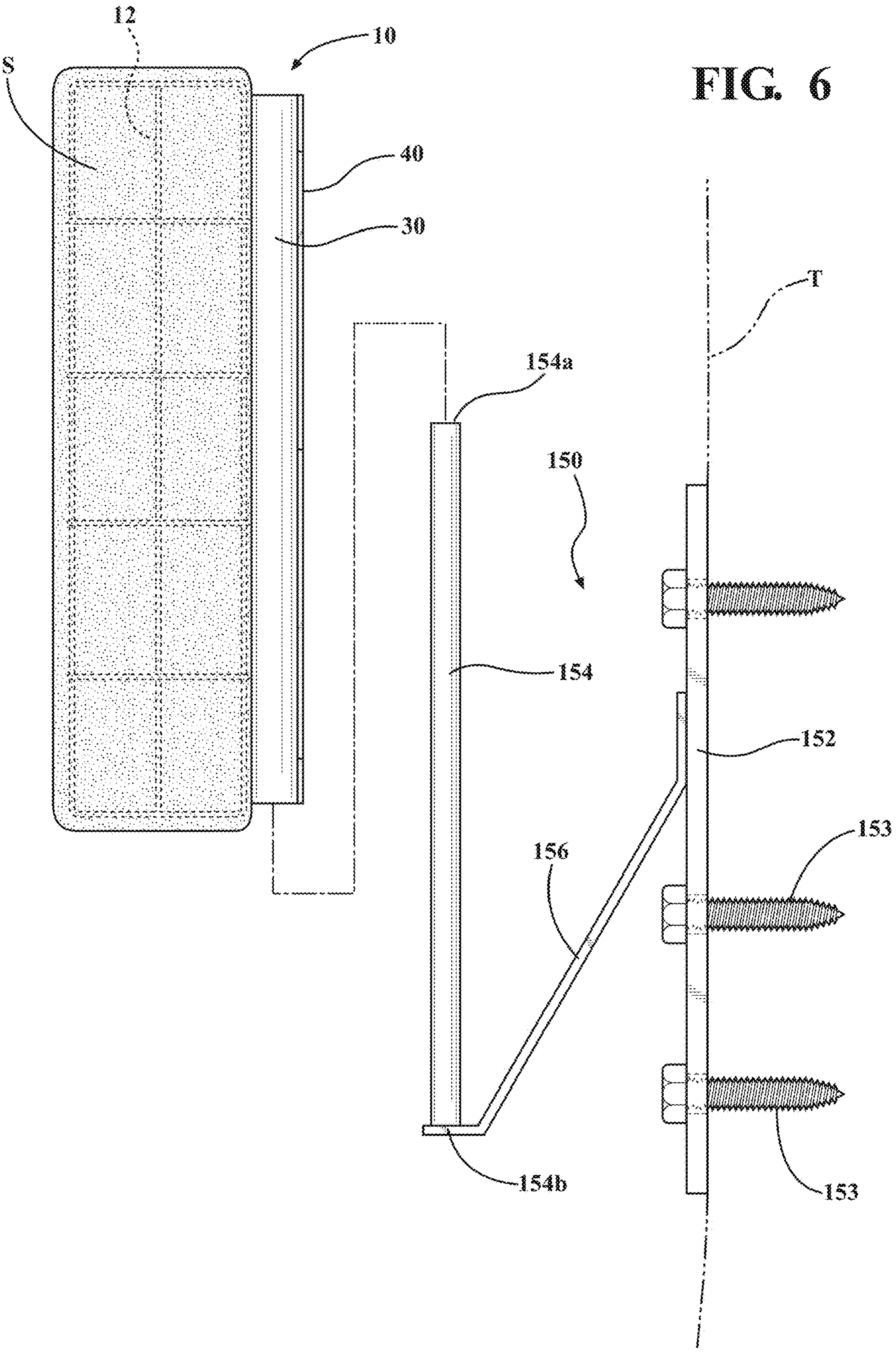
FIG. 6 is a side elevation view similar to FIG. 5, with the suet cage exploded relative to the fixture mount.
Figure 7:
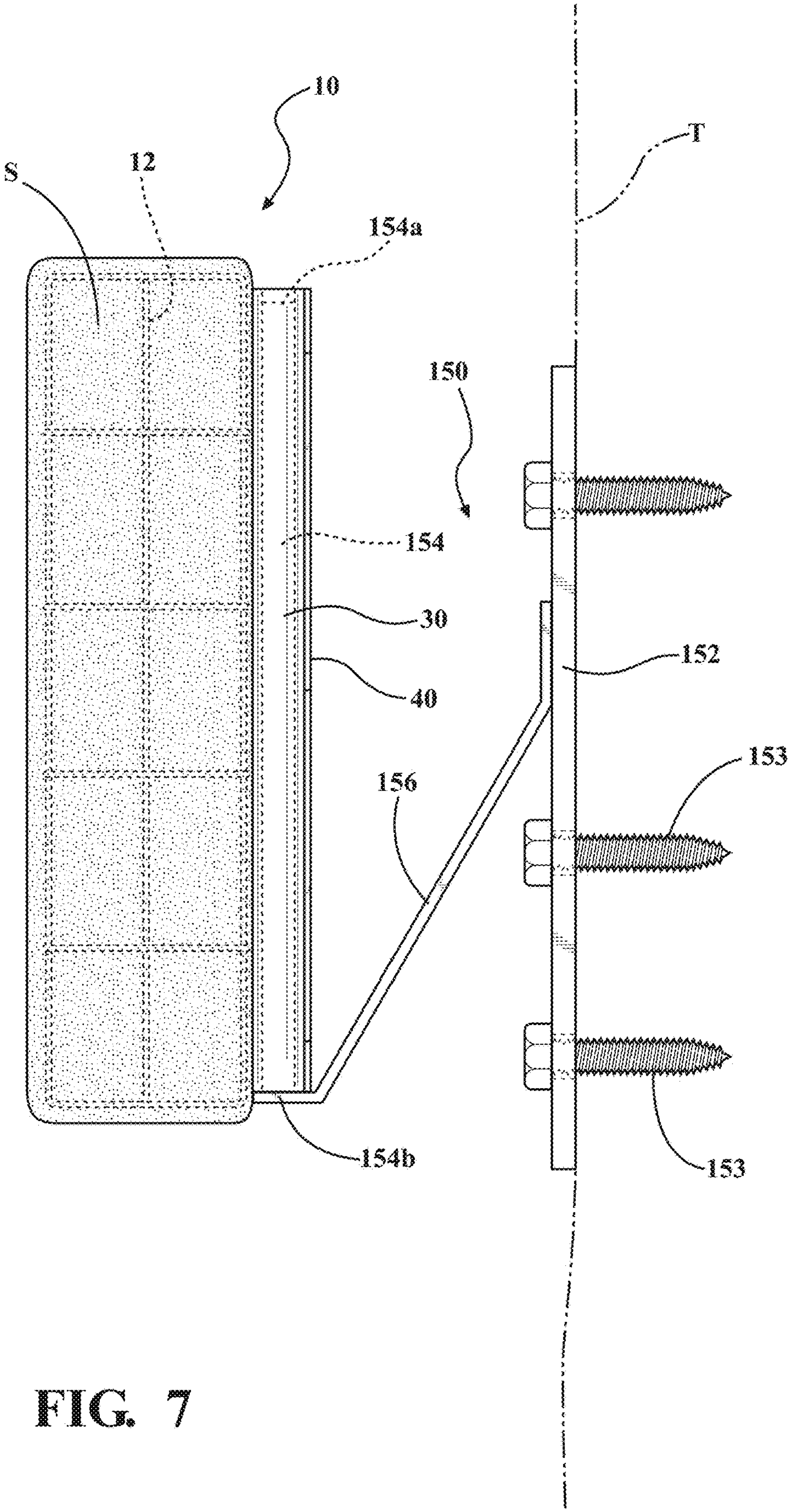
FIG. 7 is a side elevation view similar to FIG. 6, but showing the suet cage assembled to the fixture mount of FIG. 5.

Referring now to FIGS. 5-7, a cage mount 150 for suet cage 10 comprises a bracket or base 152 configured to be mounted in any known fashion to a tree, post, wall, or other solid outdoor support T. In the illustrated example, base 152 includes holes for inserting nails, screws or bolts 153 through the base into the outdoor support. Base 152 could alternately use connectors such as magnets, straps, industrial hook-and-loop (Velcro®) fastener, hooks and others to secure the mount 150 to an outdoor support. Alternately, base 152 could be formed integrally with or joined permanently to a support such as a tall metal bird feeder stake or “shepherd’s hook” by welding or integral casting.

Cage mount 150 further includes one or more vertical mounting arms 154, corresponding in number and spacing the tubular mounting member(s) 30 on cage 10. The illustrated vertical mounting arms are spaced outwardly from base 152 by standoff structure 156, the arms 154 located and configured to receive and mate longitudinally with tubular members 30 on suet cage 10. In the illustrated example, mounting arms 154 comprise cylindrical rods sized for tubular members 30 on suet cage 10 to slide over their upper ends 154*a* in a close fit. Mounting arms 154 may alternately be hollow themselves, and could be sized for solid or hollow tubular members 30 to slide into them in a close fit. The lower ends 154*b* of the mounting arms 154 in the illustrated example provided stops in the form of the terminal connection ends 156*a* of the standoff supports 156 engaging the lower ends 154*b* in a generally horizontal direction. The tubular members 30 on suet cage 10 could alternately be closed at their upper ends to provide a positive stop between the longitudinal mating of members 30 with mounting arms 154. The side view of FIGS. 6 and 7 should be understood to schematically represent a single tubular member 30 on cage 10 and a single corresponding mounting arm 154 on base 152, as well as the multiple spaced tubular members 30 and mounting arms 154 shown in the perspective view of FIG. 5.

The tubular, longitudinal sliding fit between mounting arms 154 on the cage mount 150 and the tubular members 30 on suet cage 10 serves to push any suet that may have hardened in or on tubular members 30 clear of the connection between the respective tubular members on cage mount 150 and suet cage 10. This sliding longitudinal connection is accordingly easy to make, regardless of excess suet on cage 10, regardless of weather conditions, and even if the person mounting the suet cage 10 on cage mount 150 is wearing gloves or mittens. The connection between suet cage 10 and cage mount 150 is very secure and strong, and the suet cage cannot be blown off by the wind or knocked off by birds or squirrels, particularly the closer to vertical the mounting arms are oriented for receiving the suet cage—although it will be understood that some degree of angling of the mounting arms from true vertical when installed to receive the cage is possible, as long as the mounted suet cage does not slide or blow off the mounting arms in the mounted location. "Vertical" accordingly includes such orientations. When the suet cage is empty, cage 10 can simply be lifted vertically off the cage mount 150, and cannot get stuck due to corrosion, bent parts, or other mechanical issues. Alternately, if the suet cage 10 is provided with an openable door or hatch through which a pre-formed block of suet can be added, cage 10 may mounted on the cage mount 150 as described above, but without any suet inside, and an initial block of suet added and the cage refilled with additional blocks as needed without having to remove the empty cage 10 from mount 150.

If suet cage 10 is provided with an optional hanger or hook such as 50 on its upper side as shown in FIG. 5, the person mounting cage 10 on mount 150 can simply lower the suet cage by hook 50 onto the vertical mounting arms 154 without touching the suet molded in and around the suet cage.

Cage mount 150 and its components may be made from metal, plastic, wood, or combinations thereof, as long as the suet cage tubular members 30 can slide smoothly and easily on and off the cage mounting arms 154.

Figure 8:
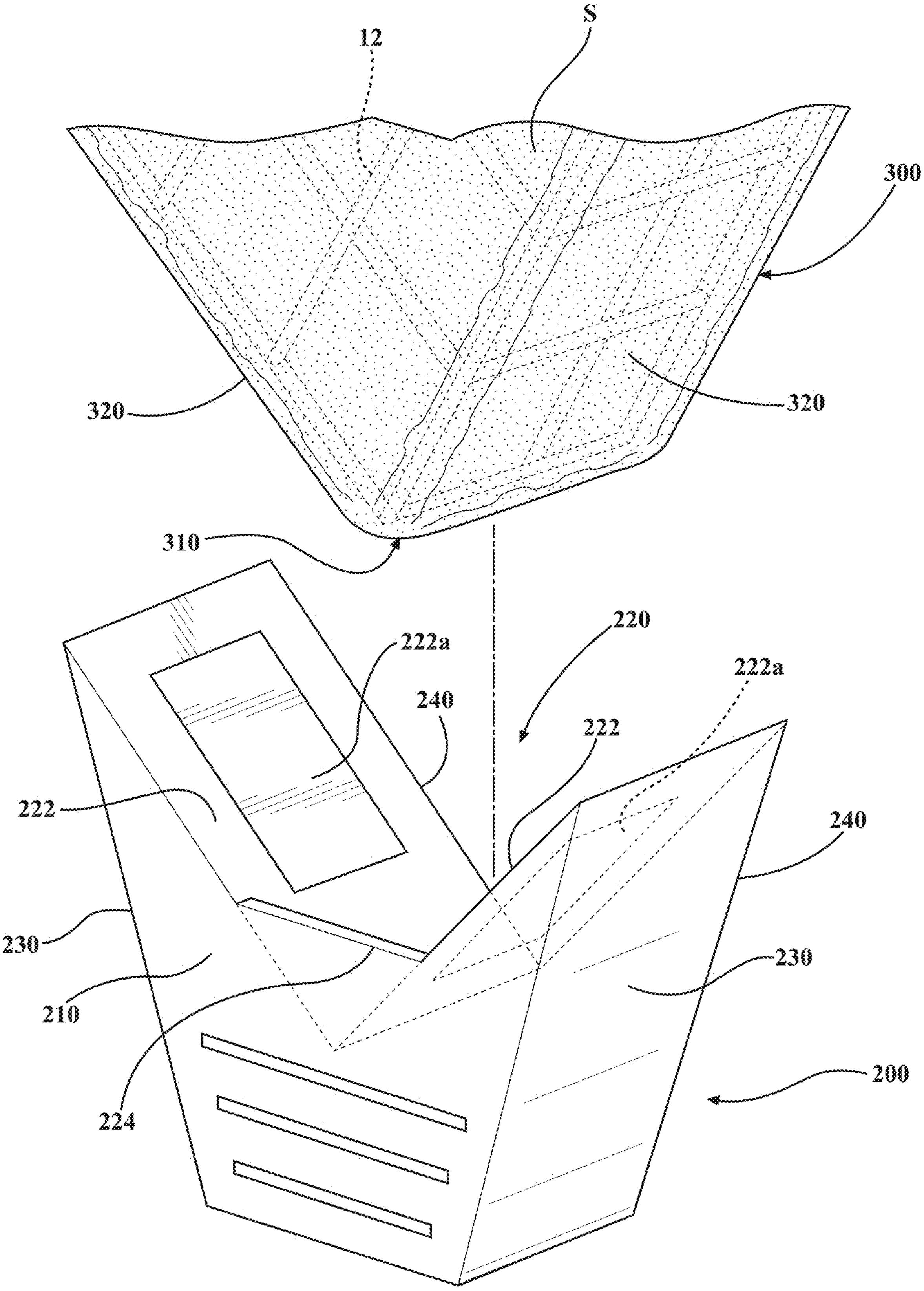
FIG. 8 is a perspective view of a magnetic tail rest in exploded assembly relative to a suet cage with a lower corner.
Figure 9:
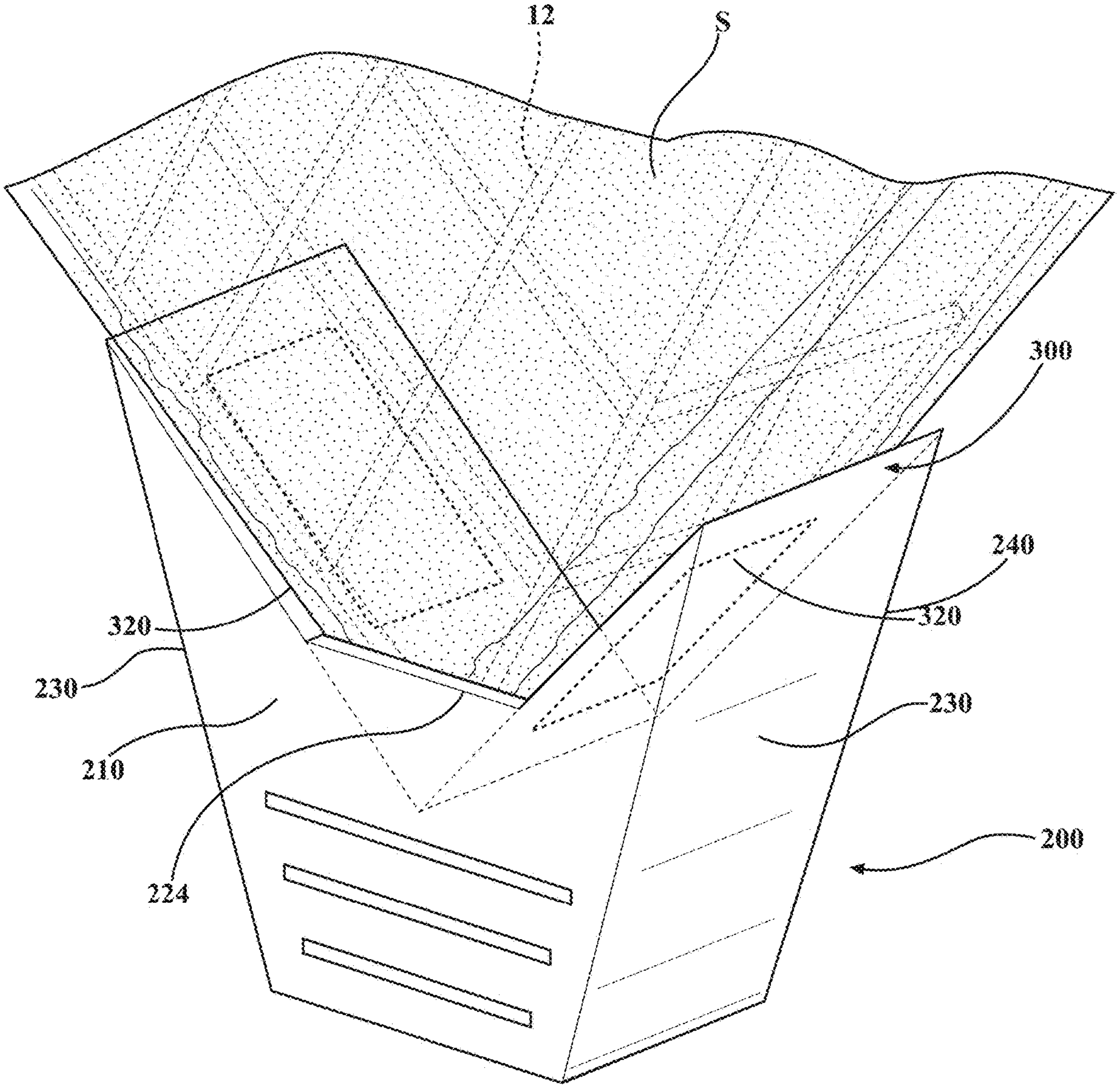
FIG. 9 shows the magnetic tail rest of FIG. 8 connected to the lower corner of the suet cage.

Referring next to FIGS. 8 and 9, a tail rest 200 according to another aspect of the invention is illustrated in a currently preferred example embodiment. Tail rest 200 may be used with a conventional suet cage 300 of conventional configuration, hung or mounted in a diagonal position in known manner with a lower corner 310 pointing down.

Tail rest 200 may also be used with suet cage 10 of FIGS. 1-7, for example if suet cage 10 were hung diagonally with a hanger/hook member such as 50, or if the tubular members or suet cage 10 were positioned on the top/rear face 16 of the cage 10 at a diagonal angle allowing the suet cage 10 to be mounted on cage mount 150 at a diagonal angle with a corner pointing down. Tail rest 200, however, is optimally useful for smaller, conventional suet cages such as 300 where larger birds' tails tend to hang down below the cage as the birds are gripping the wire 12 of the cage with their feet and feeding on the suet S therein.

Tail rest 200 comprises a generally flat front face or panel 210 sized for a resting place or counter-balancing support for a large bird's tail, in known manner. The overall shape of tail rest 200, and its front panel 210, may vary, but the upper end of tail rest 200, in the illustrated example intended for a rectangular suet cage hung diagonally, includes a shaped notch 220 shaped to conform substantially to the shape and contour of the suet cage sidewall at a lower end of the suet cage when the suet cage is mounted vertically. In the illustrated example, the notch 220 is a generally V-shaped notch comprising a pair of diverging, angled magnetic coupling surfaces 222 having an angle and width corresponding to the angle of the sidewalls 320 of the illustrated rectangular cage 300 at the lower corner 310 of the cage, and further being wide enough from front-to-back to engage a substantial portion of the cage's respective lower corner sidewalls 320. Magnetic coupling surfaces 222 comprise magnetic faces or inserts 222*a* over some of all of their faces, sufficient to make a strong magnetic connection with the typical ferromagnetic steel wire in cage 300 when the lower corner 310 of the cage is fitted into V-shaped notch 20.

While tail rest 200 only needs a front face or panel 210, it may have a body thickness corresponding to the front-to-back width of the magnetic coupling surfaces 222 for balance, structural support for the magnetic coupling surfaces, and/or appearance, if desired. In this case the tail rest 200 may have sidewalls 230 and a rear wall 240.

While tail rest 200 is shown with magnetic coupling surfaces 222 having active magnets to make the coupling to the cage, it would be possible to provide a cage 300 with magnetized lower corner surfaces along the sidewalls 320 to mate more strongly with magnets on the tail rest surfaces, or to couple with passive ferromagnetic steel surfaces at 222.

To ensure good alignment of the lower corner sidewalls of cage 300 with the magnetic coupling surfaces 222, a stop flange 224 may be provided at the front or rear junction of the V-shaped coupling surfaces. The stop flange 224 engages the outer face of the suet cage 300 at the lower corner 310 so that the lower corner sidewalls 320 of the suet cage are closely aligned front-to-back with the magnetic coupling surfaces 222.

The magnetic V-shaped coupling of the tail rest 200 with the lower corner 310 of suet cage 300 is easy to make, and very strong and secure, even if the cage 300 is coated with molded suet S (for example where cage 300 is used with a melt/mold pan such as 100 in FIGS. 1-7), and even in wet or freezing weather. The tail rest 200 may also be conveniently used with a conventional suet cage 300 having an access door for inserting a block of pre-formed suet inside the cage.

Because the tail rest 200 is primarily intended for use with smaller suet cages such as 300, a differently sized melt/mold pan 100 such as that shown in FIGS. 1-7 may be provided to closely fit the cage 300, or to modify melt/mold pan 100 with a cake-type divider of generally known form to divide the melt/mold pan in halves, quarters, etc. and thus allow two or more suitably sized smaller cages 300 to be over-molded with suet as described above in a single pan 100.

The illustrated example tail rest 200 is shown as a V-shaped structure configured to mate with the sidewalls forming the lower corner of a rectangular suet cage hung diagonally. It should be understood that the tail rest 200 may take different shapes to correspond to one or more ferromagnetic sidewall portions of a lower end of a suet cage having other than a V-shaped lower end. For example, if the lower end of the suet cage were flat or rounded, depending on the shape of the suet cage, the magnetically-attached tail rest would comprise a corresponding shape with respect to its magnetic coupling surface(s) 222.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A method for providing suet for feeding birds comprising:

providing a suet cage comprising wire grid comprising a substantially flat top face, a substantially flat bottom face, a substantially continuous sidewall extending around edges of the top and bottom faces to space the top face from the bottom face and to define an interior suet volume accessible by a bird with its beak through spaces in the wire grid, and a generally vertical tubular handle structure on the top face extending above the top face; providing a suet molding pan configured to hold said suet cage submerged except for said handle below the level of molten suet poured into said molding pan; submerging said suet cage, except for said handle, in molten suet; allowing said suet to cool and solidify; using said handle to lift said cage and solidified suet out of said molding pan; and placing said suet filled cage in a convenient location for birds.

2. The method of claim 1 which includes providing a cage mount comprising a base configured to be secured to or already mounted on an outdoor support, the cage mount further comprising a generally vertical tubular mounting arm structure, the tubular mounting arm structure configured to longitudinally receive the tubular handle structure on the suet cage in a substantially vertical sliding fit to mount the suet cage on the cage mount with the bottom face of the suet cage facing outwardly.

3. The method of claim 2, further wherein said suet molding pan is configured to receive the suet cage therein with the bottom face of the suet cage lying on a bottom face of the suet pan, the suet pan comprising interior walls defining an interior suet volume marked by an interior upper fill line on at least one of the interior walls, the interior suet volume comprising dimensions closely matching exterior dimensions of the suet cage bottom face, suet cage sidewall, and suet cage top face to receive the suet cage in a close fit therein, the suet pan further comprising an upper rim extending above the interior suet volume and the handle structure on the top face of the suet cage when the suet cage bottom face is lying flat on the bottom surface of the suet pan; wherein, the suet pan is filled with melted suet to approximately the interior upper fill line, the suet cage is placed bottom face first into the melted suet in the suet pan so that the top face of the suet cage is approximately at a level of the melted suet with the handle structure on the top face of the suet cage above the level of the melted suet;

the melted suet is allowed to cool with the suet cage in the suet pan until hardened;

the suet cage is lifted out of the suet pan by the tubular handle structure with the interior suet volume of the suet cage filled with hardened suet, oriented substantially vertically, and mounted by the tubular handle structure on the tubular mounting structure on the cage mount.

4. The method of claim 1, further wherein said suet molding pan is configured to receive the suet cage therein with the bottom face of the suet cage lying on a bottom face of the suet pan, the suet pan comprising interior walls defining an interior suet volume marked by an interior upper fill line on at least one of the interior walls, the interior suet volume comprising dimensions closely matching exterior dimensions of the suet cage bottom face, suet cage sidewall, and suet cage top face to receive the suet cage in a close fit therein, the suet pan further comprising an upper rim extending above the interior suet volume and the handle structure on the top face of the suet cage when the suet cage bottom face is lying flat on the bottom surface of the suet pan; wherein, the suet pan is filled with melted suet to approximately the interior upper fill line, the suet cage is placed bottom face first into the melted suet in the suet pan so that the top face of the suet cage is approximately at a level of the melted suet with the handle structure on the top face of the suet cage above the level of the melted suet;

the melted suet is allowed to cool with the suet cage in the suet pan until hardened;

the suet cage is lifted out of the suet pan by the tubular handle structure with the interior suet volume of the suet cage filled with hardened suet, oriented substantially vertically, and mounted by the tubular handle structure on the tubular mounting structure on the cage mount.

* * * * *